(12) United States Patent
Loving

(10) Patent No.: US 8,123,055 B2
(45) Date of Patent: Feb. 28, 2012

(54) BIAXIALLY ORIENTED INNER BOTTLE WITH EXTERNAL THREADS FOR PERSONAGE CUPS

(75) Inventor: Charles Loving, Brunswick, GA (US)

(73) Assignee: Charles Loving, Brunswick, GA (US)

(*) Notice: Subject to any disclaimer, the term of this patent is extended or adjusted under 35 U.S.C. 154(b) by 1520 days.

(21) Appl. No.: 11/498,249

(22) Filed: Aug. 3, 2006

(65) Prior Publication Data
US 2008/0029474 A1 Feb. 7, 2008

(51) Int. Cl.
B65D 23/12 (2006.01)

(52) U.S. Cl. ....... 215/12.1; 215/10; 206/457; 220/23.87

(58) Field of Classification Search ............. 220/23.87; 206/457; 215/13.1, 386, 393, 396, 10, 12.1, 215/395
See application file for complete search history.

(56) References Cited

U.S. PATENT DOCUMENTS

| | | | | | |
|---|---|---|---|---|---|
| 1,589,138 | A | * | 6/1926 | Fisk | 215/11.6 |
| 1,921,962 | A | * | 8/1933 | Bissell | 215/12.1 |
| 1,957,677 | A | * | 5/1934 | Soper et al. | 215/12.1 |
| 1,982,814 | A | * | 12/1934 | Bissell | 215/12.1 |
| 3,178,060 | A | * | 4/1965 | Bossack | 222/78 |
| 4,357,288 | A | * | 11/1982 | Oas et al. | 264/40.6 |
| 4,442,948 | A | * | 4/1984 | Levy et al. | 220/710 |
| 4,550,007 | A | | 10/1985 | Ohtsu et al. | |
| D288,293 | S | * | 2/1987 | Arvans | D9/500 |
| 4,805,808 | A | * | 2/1989 | Larson | 222/185.1 |
| 4,863,046 | A | | 9/1989 | Collette et al. | |
| 5,614,275 | A | * | 3/1997 | Chan | 428/35.7 |
| 5,738,232 | A | * | 4/1998 | Roberts et al. | 215/228 |
| 6,237,787 | B1 | * | 5/2001 | Gallo et al. | 215/12.1 |
| 6,719,159 | B2 | * | 4/2004 | Chomik | 215/343 |
| 2001/0000419 | A1 | * | 4/2001 | Heilig | 297/410 |
| 2004/0056053 | A1 | * | 3/2004 | Hollander et al. | 222/466 |
| 2004/0124192 | A1 | * | 7/2004 | Teller | 220/23.9 |

FOREIGN PATENT DOCUMENTS

| | | |
|---|---|---|
| EP | 0155763 | 9/1985 |
| JP | 10139029 A * | 5/1998 |

* cited by examiner

Primary Examiner — Sue Weaver
(74) Attorney, Agent, or Firm — Jerome J. Norris

(57) ABSTRACT

A biaxially oriented bottle with exterior threading in a hollow of a personage figure to form a unitary drinking cup, comprising: exterior threading at the base of the inner bottle to secure the inner bottle fast in internal threading at the base of the personage figure; exterior threading at the upper end of the inner bottle to secure the inner bottle fast into the internal threading at the top above the head of the personage figure; and wherein a handle is inscribed within the base of the inner bottle inside the exterior threading to enable the inner bottle to be wound fast to the internal threading in the hollow of the personage figure.

6 Claims, 4 Drawing Sheets

BIAXIALLY ORIENTED INNER BOTTLE WITH EXTERNAL THREADS FOR PERSONAGE CUPS

FIELD OF THE INVENTION

The present invention relates to a heat-treated, biaxially oriented, thermally stable inner vessel or bottle with exterior threads for securing it inside of a personage figure to form a drinking cup.

BACKGROUND OF THE INVENTION

The Prior Art

Plastics have been widely used to make containers due to their relatively inexpensive cost and durability; however, one drawback of plastics is their tendency to soften and deform over time when used as a cup to hold hot beverages. This is in part due to the fact that these plastics are made by blow-molding a preform, which creates a significant stress frozen in the container walls. This stress relaxes in response to heat, thereby causing shrinkage of the container.

Processes that entail blowing a pre-form into a hot mold are known, where blowing the pre-form in a hot mold takes place at around 100° C while maintaining the resultant container in contact with hot mold walls to enable only limited thermally induced crystallization and some limited annealing to permit limited release of stresses created by blow molding.

U.S. Pat. No. 4,863,046 pertains to a series of heat treatments to a pre-form, followed by axially stretching the pre-form, and then blow-molding it in a heated mold.

The foregoing single-mold processes in the U.S. and U.K. publications accomplish moderate thermal stability by increasing the mobility of polymer chains and allowing stresses to relax. However, the single-mold processes only provide limited shrinkage resistance to the polymer due to the fact that the polymer has a range of molecular weights, and the molecules take a range of times to relax—that is, some polymer molecules will relax quickly while other polymer molecules will take a longer time to relax. Accordingly, to provide improved shrinkage resistance, a two-mold blow-molding process in which a first blow-molded article is heated to a relatively high temperature for a relatively long time is allowed to permit sufficient shrinking as a result of heating, and the polymer is then reblown.

U.S. Pat. No. 4,550,007 disclose a two-step process in which the first molded article is slightly larger than the desired final container and wherein the first article is heated in a first mold by keeping it in contact with very hot mold walls, after which the article is removed and allowed to freely shrink. Thereafter, the shrunken article is transferred to a second mold and heated at a lesser temperature range before it is blown into a final container.

A two-mold, blow-mold process is also disclosed in European Patent Application No. 0,155,763, wherein the first article is slightly oversized in relation to the final desired container, and is heated in a first mold and then allowed to freely shrink prior to reblowing.

In both of these two-mold processes, the initial blown article is heated in the mold and then allowed to freely shrink. The free shrinkage of the first article creates an unevenness in the wall thickness that results in an unevenness in the final blown container. Further, due to practical constraints upon the molding process, it is necessary to keep the article in the first mold for only a short period of time thereby creating a condition wherein the heating in the second molding process cumulatively makes the heating and molding process longer.

There is a need in the molding process to avoid unevenness in the wall thickness of the final blown container resulting from the limitations of the single-mold and two mold processes and the limited shrinkage resistance associated therewith. Avoidance of these processes and thereby the shrinkage encumbrances associated therewith would enable precisely molded exterior threads on a preform at the top of a plastic tube and precisely molded exterior threads at the bottom of a plastic tube to enable it to be wound into an interiorly threaded hollow vessel shaped in the form of a specific personage figure—and thereby form a unitary personage figure drinking cup.

SUMMARY OF THE INVENTION

In general, the inner bottle injection molded preform plastic tube (HDPE) with precisely molded exterior threads at the bottom and top thereof is conveyed into a blowing station, and a stretch rod is utilized to adjust the plastic preform along its length. Next, low-pressure air is utilized to begin the blowing process followed by a higher-pressure air burst. Thereafter cold mold walls are utilized to solidify the molecular biaxial orientation into a container after which the container is opened and the HDPE product is ejected from the mold.

One object of the invention is to provide a biaxially oriented inner bottle of HDPE with exterior threads wherein an exterior thread at the lower end serves to lock the inner bottle inside of interior threading in the base of the hollow of the personage figure to form a unitary drinking cup.

Another object of the present invention is to provide a biaxially oriented inner bottle of HDPE with an exterior thread at the upper end to enable a spill-proof cap to be wound thereon above the head of the personage figure.

Other objects of the invention will become apparent by resort to the brief description of the drawing figures.

DETAILED DESCRIPTION OF PREFERRED EMBODIMENT OF THE INVENTION

An inner bottle injection molded preform plastic tube of high density polyethylene (HDPE) with precisely molded exterior threads at the top and bottom thereof and a precisely molded recessed handle in its base is conveyed into a blowing station and a stretch rod is employed to adjust the plastic preform along its length. Thereafter, low-pressure air in a range of from about 60 to about 110 psi is utilized to begin the blowing process followed by a high-pressure air burst at a range of from about 111 to 250 psi. Next, cold mold walls at a temperature of from about 40 to about 50° C. is utilized to solidify the molecular biaxial orientation into a container, after which the container is opened and the HDPE product is ejected from the cold mold in dimensions precisely as initially molded in the injection molded preform.

In the case where the biaxially oriented inner bottle is polyethylene terepthalate (PET), the low pressure air range is from about 300 to about 425 psi, and the high pressure air range is from about 426 to 620 psi.

Figure 1:
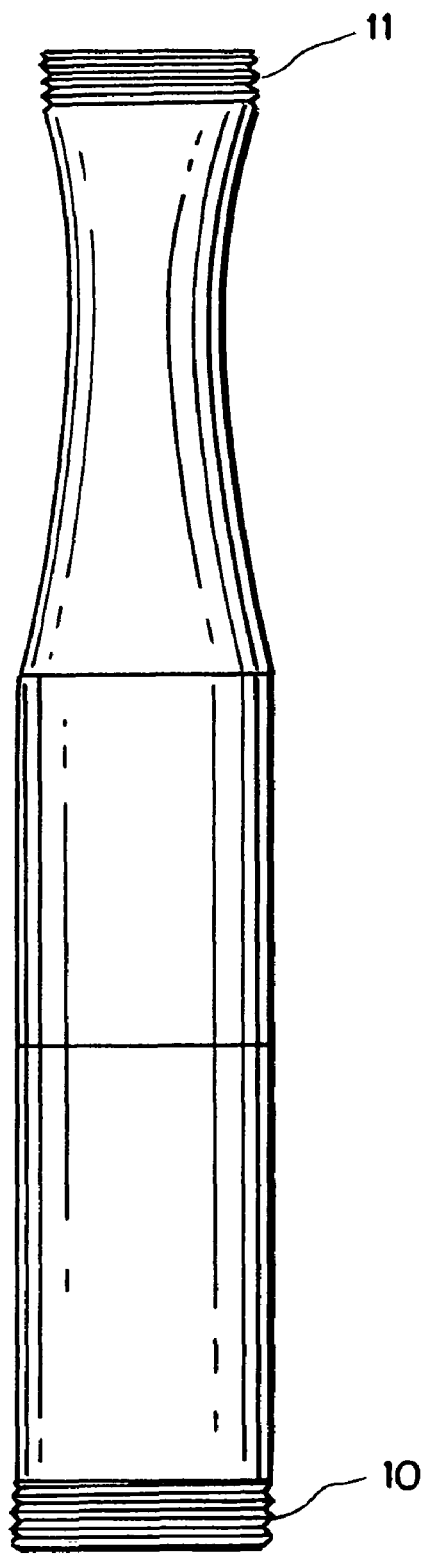
FIG. 1 is a perspective view of the biaxially oriented inner bottle showing exterior threads at the base of the bottle for securing it inside of the interior threads of a personage figure, and also showing exterior threads at the top of the bottle for securing a spill-proof cap or top above the head of a personage figure.

Reference is now made to FIG. 1 which shows a side view of the biaxially oriented inner bottle showing exterior threads 10 at the bottom most part for holding it secure in internal threads in the base of a personage figure, and uppermost exterior threads 11 for holding a leak-proof top with internal threads.

Figure 2:
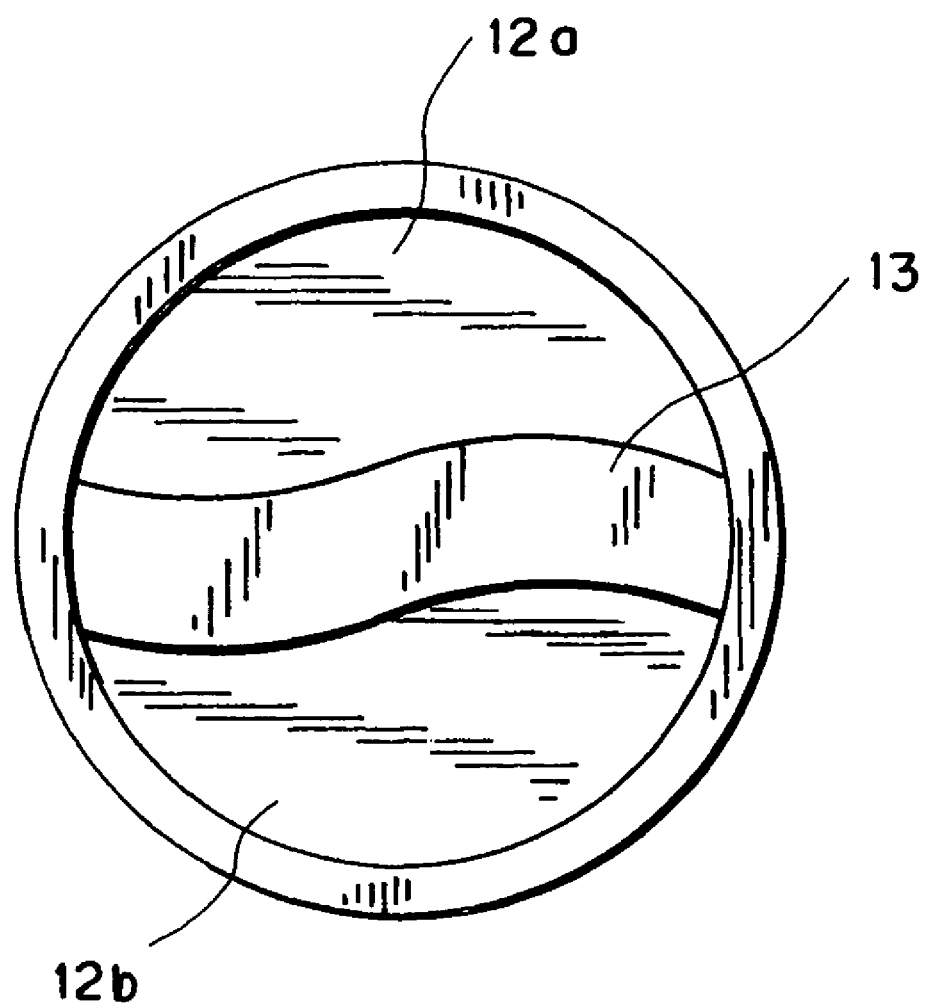
FIG. 2 shows a bottom view of the inner bottle with recessed handle in the base for securing the inner bottle into interior threadings at the base of a personage figure.

A bottom view of the biaxially oriented inner bottle having recessed compartments 12a and 12b and a raised handle portion 13 for screwing the inner bottle into interior threaded portions of the bottom of a personage figure is shown in FIG. 2.

Figure 3:
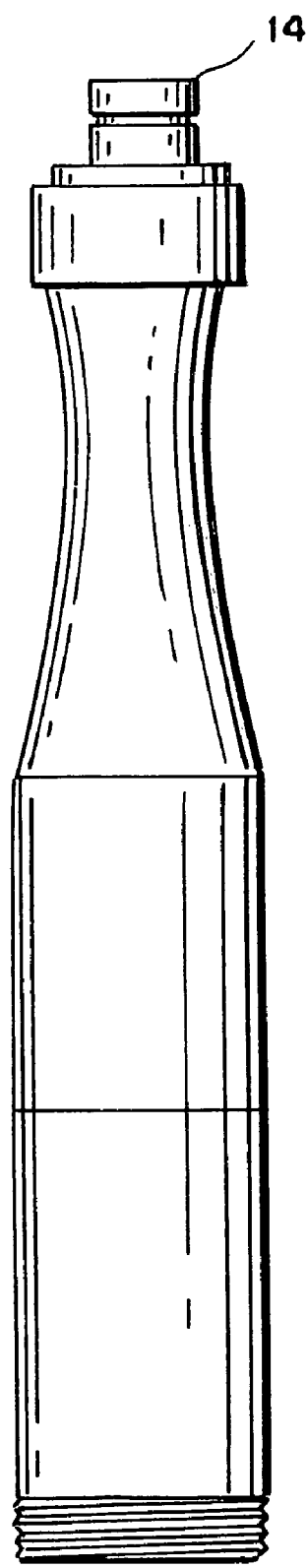
FIG. 3 shows the biaxially oriented inner bottle secured to a spill-proof top.

FIG. 3 is a view of the biaxially oriented inner bottle showing an internally threaded leak-proof top 14 threaded on the exterior upper threads of the bottle.

Figure 4:
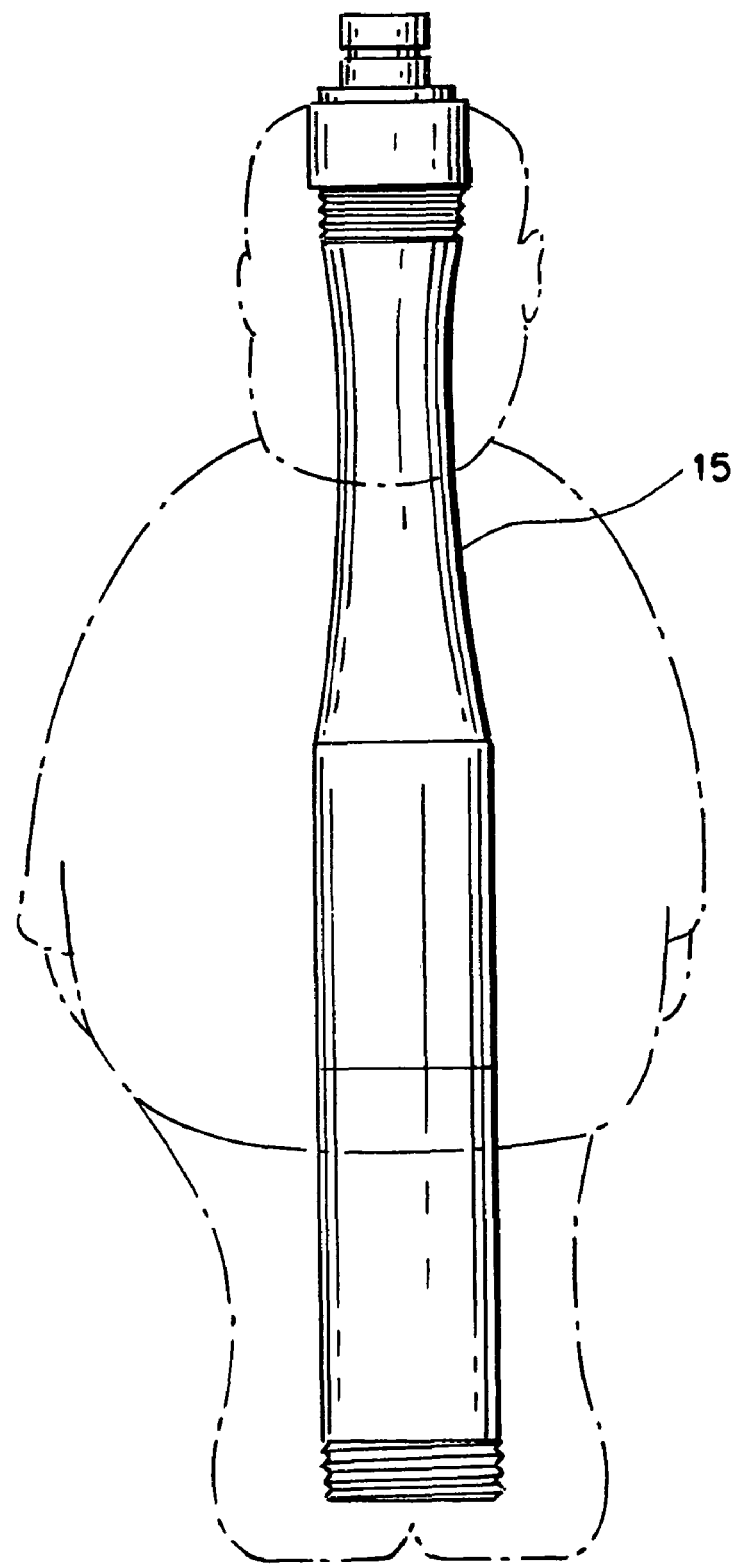
FIG. 4 is a perspective view of a personage figure with the biaxially oriented inner bottle (dotted lines), and wherein a spill-proof cap or top is wound around the exterior threadings of the top portion of the inner bottle.

The biaxially oriented inner bottle inside of a personage figure is shown depicted by the phantom lines of the bottle contour in FIG. 4.

The bottom most exterior threads of the biaxially oriented inner bottle serve to hold the bottle within the internal threaded portions of the bottom of the personage figure to make a unitary drinking cup.

A recessed section in the bottom of the biaxially oriented inner bottle facilitates easy exchanges of the bottle by allowing the fingers to grip a raised middle section or handle 13 within the recess to lock and unlock the inner bottle by merely turning it.

A leak-proof cap or top 14 is wound tight about the upper threadings 11 of the inner bottle after the inner bottle is tightened into the personage figure—and FIG. 3 shows the cap or top 14 wound in place in the absence of the personage figure.

The phantom or dotted lines 15 of the biaxially oriented inner bottle wound in place inside of the personage figure of FIG. 4 makes it apparent that any personage may be utilized about the disguised inner cup without any detraction or diminution of the personage.

It will be understood that the invention may be embodied in other specific forms without departing from the spirit or central characteristics thereof. The present example and embodiment, therefore, is to be considered in all respects as illustrative and not restrictive, and the invention is not to be limited to the details given herein.

I claim:

1. A biaxially oriented inner bottle with exterior threading to secure it in a hollow of a personage figure to form a unitary drinking cup, comprising:
    exterior threading means at the base of said inner bottle to secure said inner bottle fast in internal threading at the base of the personage figure;
    exterior threading means at the upper end of said inner bottle to secure said inner bottle fast into the internal threading of a top above the head of the personage figure; and wherein handle means are inscribed within the base of said inner bottle inside of the exterior threading to enable said inner bottle to be wound fast in the internal threading in a hollow of said personage figure.

2. The biaxially oriented inner bottle of claim 1, wherein said inner bottle is a polyolefin.

3. The biaxially oriented inner bottle of claim 2 wherein said polyolefin is selected from the group consisting of polyethylene, polypropylene, poly(1-butene), poly(3-methylbutene), poly(4-methylpentene) and copolymers of ethylene with propylene, 1-butene, 1-hexene, 1-octene, 1-decene, 4-methyl-1-pentene, and 1-octadecene.

4. The biaxially oriented inner bottle of claim 3, wherein said handle means inscribed within said base is recessed.

5. The biaxially oriented inner bottle of claim 4 wherein the polyolefin is polyethylene.

6. The biaxially oriented inner bottle of claim 5 wherein the polyethylene is high density polyethylene.

* * * * *